(12) United States Patent
Shelby

(10) Patent No.: US 8,177,375 B1
(45) Date of Patent: May 15, 2012

(54) PROTECTIVE COVER FOR BINOCULARS

(76) Inventor: Joseph E. Shelby, Comanche, OK (US)

( * ) Notice: Subject to any disclaimer, the term of this patent is extended or adjusted under 35 U.S.C. 154(b) by 12 days.

(21) Appl. No.: 12/806,702

(22) Filed: Aug. 19, 2010

(51) Int. Cl.
*G02B 21/00* (2006.01)
(52) U.S. Cl. .................................. 359/600; 359/511
(58) Field of Classification Search .............. 359/399, 359/511, 600, 611
See application file for complete search history.

(56) References Cited

U.S. PATENT DOCUMENTS

| | | | | |
|---|---|---|---|---|
| 3,426,433 A | * | 2/1969 | Anderson | 42/129 |
| 3,642,345 A | * | 2/1972 | Akin et al. | 359/511 |
| 4,865,191 A | * | 9/1989 | Easter | 206/316.3 |
| 5,020,894 A | * | 6/1991 | Weyrauch et al. | 359/511 |
| D323,372 S | * | 1/1992 | Heckerman | D22/108 |
| 5,183,953 A | * | 2/1993 | Anderson et al. | 42/96 |
| 5,784,195 A | | 7/1998 | Mac Collum | |
| 6,179,427 B1 | | 1/2001 | Murg | |
| D601,341 S | * | 10/2009 | Arman | D3/267 |
| 2002/0089752 A1 | * | 7/2002 | Morgan, III | 359/600 |

* cited by examiner

*Primary Examiner* — Thong Nguyen
(74) *Attorney, Agent, or Firm* — Thomas R. Weaver

(57) ABSTRACT

A protective cover for the front and rear lenses of a barrel of an optical instrument such as a set of binoculars. The cover includes a removable shield for each of the lenses, wherein each shield is attached to a support which is removably attached to a barrel of the binoculars. The cover is constructed of flexible materials having elastic properties.

5 Claims, 3 Drawing Sheets

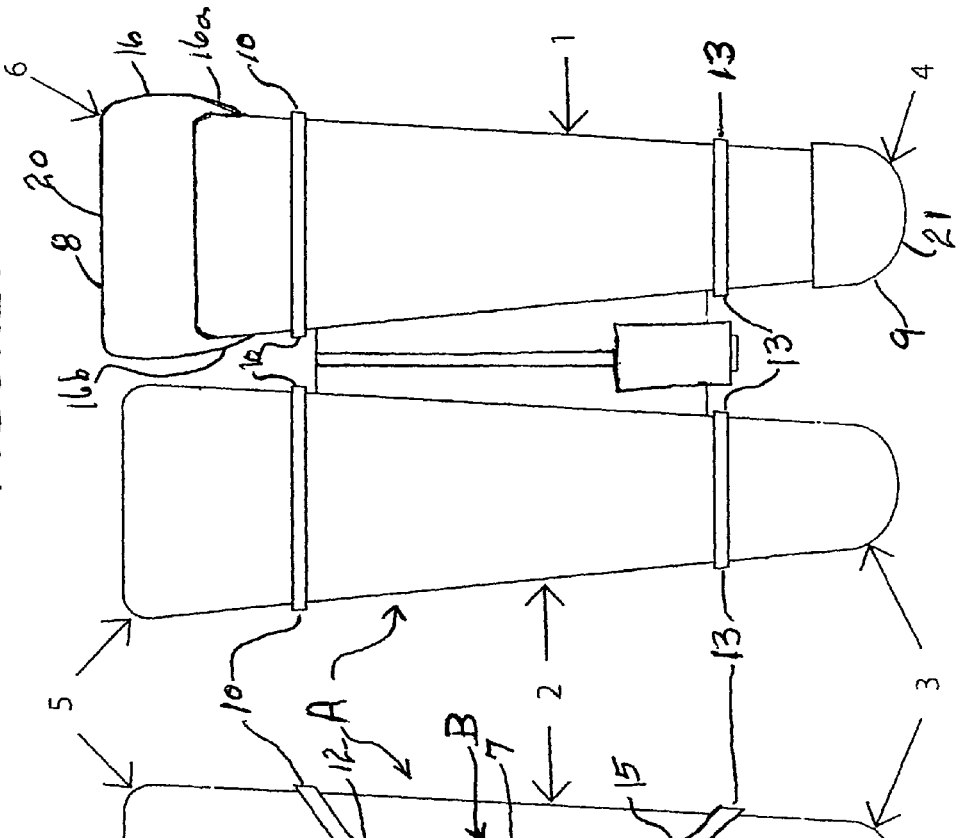
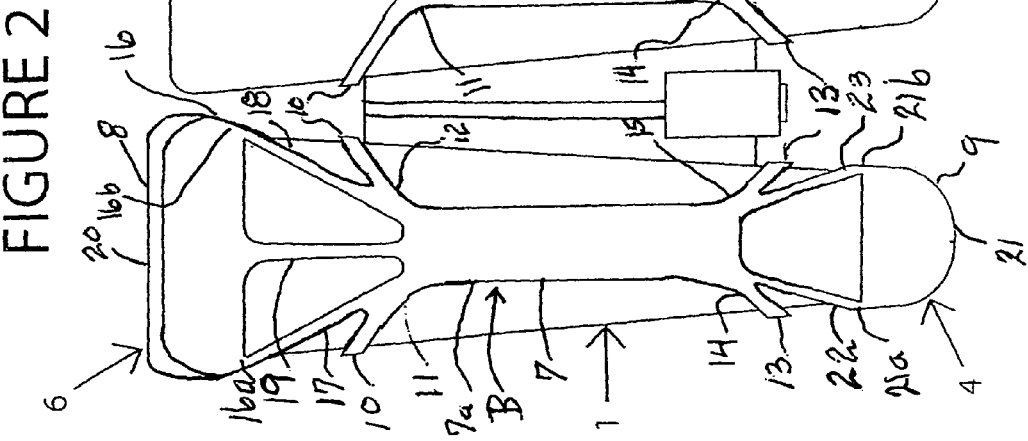

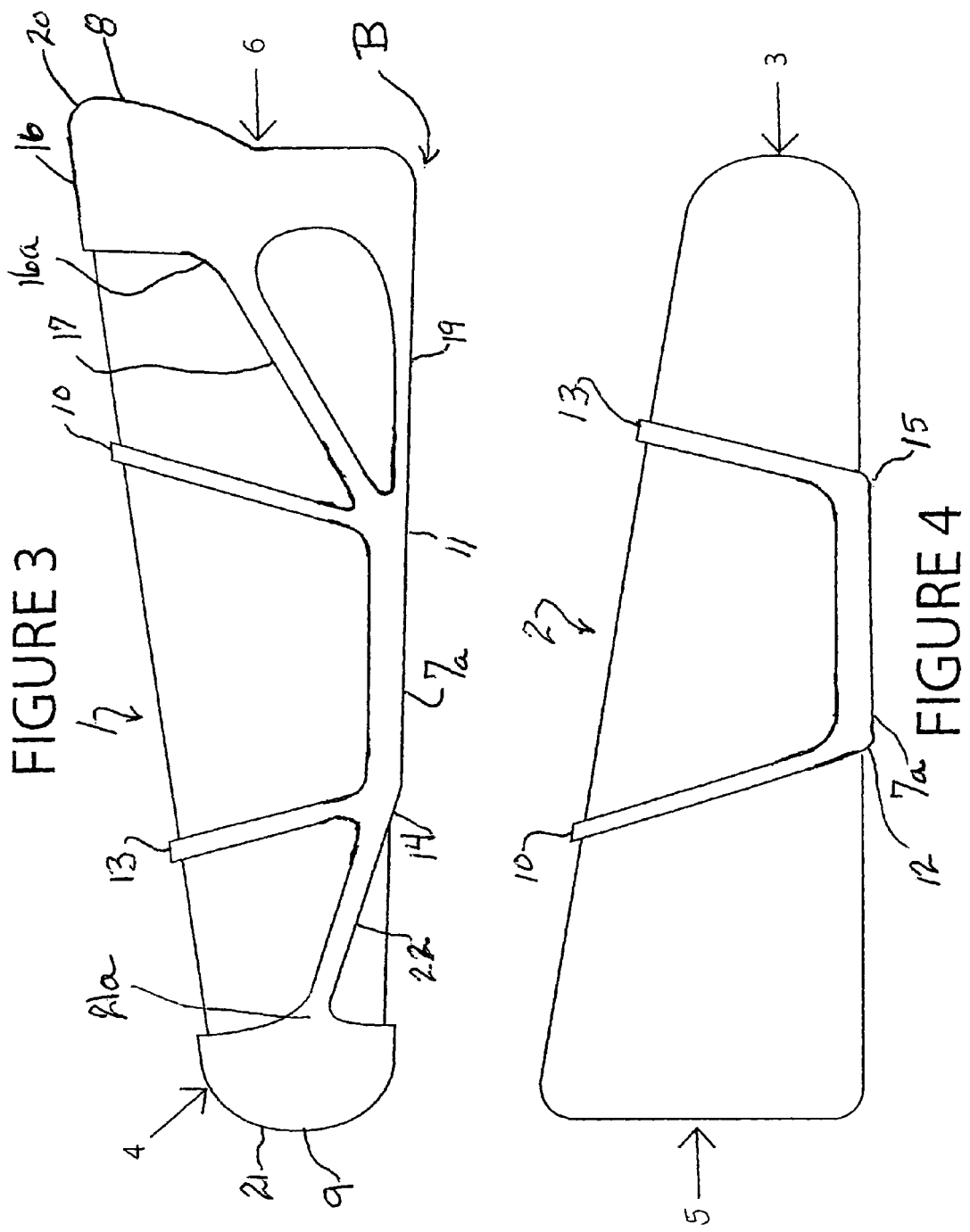

PROTECTIVE COVER FOR BINOCULARS

BACKGROUND OF THE INVENTION

1. Technical Field of the Invention

This invention broadly relates to optical instruments useful for making a distant object appear nearer. Such instruments are comprised of an arrangement of lenses which operate to magnify the image of the distant object to aid in visual observation of the object. The invention further relates to optical instruments which are adapted for manual use such as a telescope, which is useful with one eye, and binoculars, which are useful with two eyes. The invention more particularly relates to an article of manufacture which protects the lenses of the telescope or binoculars.

2. Description of the Prior Art and Problems Solved

An optical instrument of a size adapted for manual use by a single observer, such as a telescope or a set of binoculars, has lenses which can be damaged because they become scratched and dusty. This lense damage problem has been solved by the use of protective covers for the lenses. The known protective covers have included rigid caps which enclose a lense. Such known caps are not attached to the optical instrument, and are easily misplaced and easily lost. The known caps are difficult to manually mount on and remove from the lenses with one hand while the instrument is being used to observe some distant object.

What is required are protective shields for the lenses of a set of binoculars or a telescope which can be manually mounted on and removed from the lenses. The shields should be readily and easily employed to cover and uncover the lenses with one hand, while the other hand retains a grip on the instrument. The caps should remain attached to the instrument while the instrument is being used to view a distant object.

SUMMARY OF THE INVENTION

By this invention there is provided an article of manufacture, broadly referred to herein as a cover, which includes a protective shield for the front lense and a protective shield for the rear lense of a barrel of a telescope or for each barrel of a set of binoculars. The cover of this invention is applicable to a telescope, which has a single barrel, and also to a set of binoculars, which has two barrels. For purposes of simplicity only, the remainder of this disclosure is directed to a set of binoculars. Accordingly, a set of binoculars, requires two covers, one for each barrel of the binoculars.

The cover of this invention is comprised of three essential elements which are a barrel support, a front lense cap and a rear lense cap, which is sometimes referred to herein as an eye-piece cap. The front lense cap is employed to protect the front lense of a single barrel of a set of binoculars, and the eye-piece cap is employed to protect the rear lense of the same barrel of the set of binoculars.

The barrel support is comprised of a linear, substantially rectangular, body having a linear axis, a forward end, a rearward end, a first strap and a second strap. The length of the linear axis of the linear body is greater than the length of the transverse axis of the linear body, and the diameter of the barrel is greater than the length of the transverse axis of the linear body. The first strap is connected to the forward end of the linear body at two separate locations to thereby form a first continuous loop, wherein the first of the two locations and the second of the two locations are on the opposite sides of the linear axis of the linear body. The second strap is connected to the rearward end of the linear body at two separate locations to thereby form a second loop, wherein the first of the two locations and the second of the two locations are on the opposite sides of the linear axis of the linear body. The first and second loops are used to removably attach the barrel support to the bottom side of the barrel so that the linear axis of the linear body is positioned parallel to the linear axis of the barrel.

The front lense cap is attached to the forward end of the linear body. The eye-piece cap is attached to the rearward end of the linear body. Each cap is, accordingly, indirectly removably attached to the bottom side of the barrel. Therefor, the lense caps, being attached to the barrel support, are suspended beneath the barrel when they are not being used to protect the lenses.

The front lense cap is comprised of a lense shield and at least one tie which connects the lense shield to the forward end of the linear body of the barrel support. The eye-piece cap is comprised of an eye-piece shield and at least one tie which connects the eye-piece shield to the rearward end of the linear body of the barrel support.

Each lense shield is of a size necessary to completely enclose the end of a barrel. It is known that a lense is placed within the interior of the end of a barrel in a position perpendicular to the linear axis of the barrel. Accordingly, it will be appreciated that a lense shield also completely encloses a lense.

Each barrel of a set of binoculars can be tubular in cross-section so that the front lense and the rear lense are each contained in identical cross-sections, accordingly, each shield is the same size. In contrast, each barrel of a set of binoculars can be in the form of a truncated cone wherein the diameter of the front end is greater than the diameter of the rear end so that the front lense is larger in diameter of the rear lense in which case the respective shields are not the same size.

Each lense cap can be, and is at least partially, constructed with a flexible material having elastic properties. Accordingly, to position a cap over the end of a barrel in a protective mode the cap must be able to stretch under the influence of manual force to enable placement of the cap over the end of the barrel and thus the lense.

In one preferred embodiment, the protective cover of this invention is a single, elastic unitary article consisting of the barrel support, the front lense cap and the eye-piece cap.

DESCRIPTION OF THE DRAWINGS

FIG. 1 is a plan view of the top side of a set of binoculars. The right side of FIG. 1 (designated by the numeral 1) shows the right side barrel of the binoculars as being fully equipped with the protective cover of this invention. The left side of FIG. 1 (designated by the numeral 2) shows the left side barrel of the binoculars as being partially equipped with the protective cover of this invention.

FIG. 2 is a plan view of the bottom side of the binoculars of FIG. 1. The left side of FIG. 2 (designated by the numeral 1) is shown to be fully equipped with the protective cover of this invention. The right side of FIG. 2 (designated by the numeral 2) is shown to be partially equipped with the protective cover of this invention.

FIG. 3 is a view of the right side of FIG. 1.
FIG. 4 is a view of the left side of FIG. 1.

DESCRIPTION OF THE INVENTION

Figure 5:
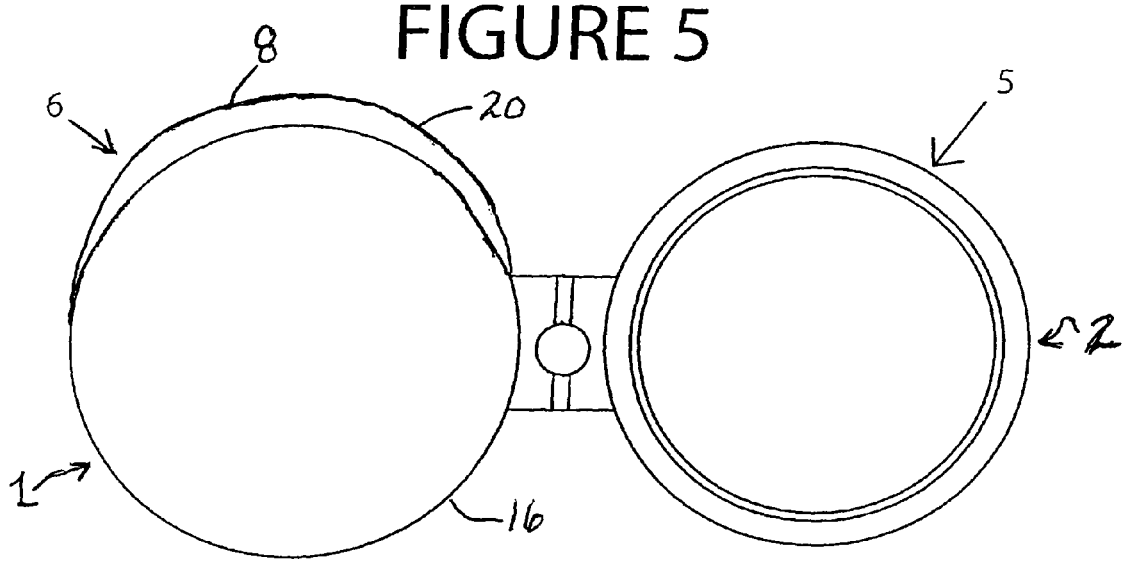
FIG. 5 is a view of the front side of FIG. 1.
Figure 6:
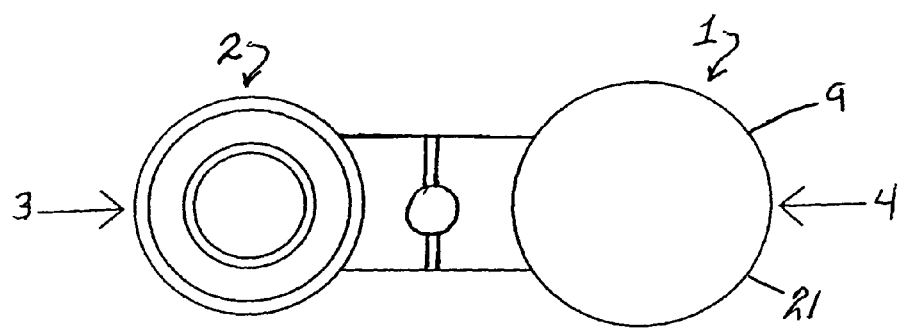
FIG. 6 is a view of the rear side of FIG. 1.

The protective cover of this invention is an article of manufacture comprised of three essential elements. These three elements are a base support, hereinafter referred to as a barrel support, a front lense cap and a rear lense cap, hereinafter sometimes referred to as an eye-piece cap. In one preferred embodiment the protective cover of this invention is a single unitary article consisting of a barrel support, a front lense cap and an eye-piece cap.

It is known that a set of binoculars is comprised of two substantially parallel barrels, wherein each such barrel has a lense and an eye-piece. Each barrel can be tubular in shape or it can be in the shape of a truncated cone. Accordingly, a set of binoculars requires two protective covers of this invention, one for each barrel.

The barrels of the binoculars (as employed in connection with the protective cover of this invention) are in the shape of a truncated cone. Accordingly, the diameter of each barrel uniformly decreases from the lense end (the forward end) to the eye-piece end (the rearward end).

The protective cover of this invention, consisting of the mentioned three essential elements, is shown in FIGS. 1 and 2 as it would appear when mounted on side 1 of FIG. 1. An incomplete cover of this invention, consisting solely of the barrel support, is shown in FIGS. 1 and 2 as it would appear when mounted on side 2 of FIG. 1.

FIG. 1 is a plan view of the top side of Binoculars A having right side barrel 1, left side barrel 2, front lense side 5, front lense side 6, eye-piece side 3 and eye-piece side 4. Right side 1 is equipped with a complete protective cover of this invention, consisting of the mentioned three essential elements. Left side 2 is equipped with an incomplete cover of this invention wherein the front lense cap and the eye-piece cap are not shown.

FIG. 2 is a plan view of the bottom side of Binoculars A. Accordingly, to obtain FIG. 2, binoculars A, having the protective covers positioned as indicated in FIG. 1, are flipped over by 180 degrees, accordingly, sides 1, 2, 3, 4, 5 and 6 are likewise flipped over by 180 degrees.

FIGS. 1 and 2 show protective cover B as completely installed on right barrel 1 of binoculars A, and as partially installed on left barrel 2 of binoculars A. Cover B is comprised of barrel support 7, front lense cap 8, and eye piece cap 9.

As seen in FIGS. 2, 3 and 4, barrel support 7 is comprised of linear body 7a, forward barrel strap 10 and rearward barrel strap 13. Linear body 7a is a substantially rectangular body having a linear axis, a forward end and a rearward end. Linear body 7a and barrel straps 10 and 13 are preferably constructed of flexible materials having elastic properties.

As shown in FIGS. 2, 3 and 4, barrel support 7 is mounted on Binoculars A, wherein linear body 7a is positioned on the bottom side of a barrel, e.g. left side barrel 2, of binoculars A intermediate a lense side, e.g. front lense side 5, and an eye-piece side, e.g. side 3, so that the linear axis of body 7a is parallel to the linear axis of the barrel of binoculars A. As shown in FIG. 2, the length of the transverse axis of linear body 7a is less than the diameter of a barrel of Binoculars A.

Forward barrel strap 10 is attached to linear body 7a at junction points 11 and 12 located at the corners of the forward end, i.e., the lense end, of linear body 7a. As shown, junction points 11 and 12 are positioned on opposite sides of the linear axis of body 7a. Barrel strap 10, accordingly, forms a continuous loop extending from junction point 11 to junction point 12. It is apparent from FIGS. 1, 2, 3 and 4 that the forward end of a barrel of Binoculars A extends through the continuous loop formed by strap 10.

Rearward barrel strap 13 is attached to linear body 7a at junction points 14 and 15 located at the corners of the rearward end, i.e., the eye-piece end, of linear body 7a. As shown, junction points 14 and 15 are positioned on opposite sides of the linear axis of linear body 7a. Barrel strap 13, accordingly, forms a continuous loop extending from junction point 14 to junction point 15. It is apparent from FIGS. 1, 2, 3 and 4 that the rearward end of a barrel of Binoculars A extends through the continuous loop formed by strap 13.

The barrels shown in binoculars A are in the form of a truncated cone. Accordingly, the length of forward barrel strap 10 is greater than the length of rearward barrel strap 13 because the circumference of the barrel in the vicinity of the position of strap 10 is greater than the circumference of the barrel in the vicinity of the position of strap 13.

Front lense cap 8 is comprised of lense shield 16, right tie 17, left tie 18 and center tie 19. Lense shield 16 is of a size necessary to completely enclose the lense end, e.g. lense end 5, of each barrel of Binoculars A. Lense shield 16, right tie 17, left tie 18 and center tie 19 are preferably constructed of flexible materials having elastic properties.

Lense shield 16 is attached to the forward end of linear body 7a by forward ties 17, 18 and 19. Tie 17 is attached to junction 11 of linear body 7a and to junction 16a of shield 16 intermediate (about halfway between) the top side and the bottom side of shield 16. Tie 18 is attached to junction 12 of linear body 7a and to junction 16b of shield 16 intermediate (about halfway between) the top side and the bottom side of shield 16. As shown in FIG. 2, junctions 16a and 16b are positioned on the opposite sides of the linear axis of linear body 7a. Tie 19 is attached to linear body 7a intermediate junction 11 and junction 12 and to shield 16 intermediate junctions 16a and 16b. Tie 19 is substantially in line with the linear (longitudinal) axis of linear body 7a. As shown in FIGS. 2 and 3, lense shield 16 is further comprised of lip 20 which protrudes outwardly from shield 16 on the top side of shield 16.

Eye-piece cover 9 is comprised of eye-piece shield 21, rearward tie 22 and rearward tie 23. Eye-piece shield 21 is attached to the rearward end of linear body 7a by ties 22 and 23. Tie 22 is attached to junction 14 of linear body 7a and to junction 21a of shield 21 intermediate (about halfway between) the top side and the bottom side of shield 21. Tie 23 is attached to junction 15 of linear body 7a and to junction 21b of shield 21 intermediate (about halfway between) the top side and the bottom side of shield 21. As shown in FIG. 2, junctions 21a and 21b are positioned on the opposite sides of the linear axis of linear body 7a.

Eye-piece shield 21 is of a size necessary to completely enclose the eye-piece end, e.g. eye-piece end 3, of each barrel of binoculars A. Eye-piece shield 21, rearward tie 22 and rearward tie 23 are preferably constructed of flexible materials having elastic properties.

Comparing FIGS. 2 and 3, it is shown that shields 16 and 21 completely enclose the lense end and the eye-piece end of a barrel, respectively, and, accordingly, completely enclose the lense and the eye-piece of a barrel.

Flexible materials having elastic properties believed to be useful herein include warp knit constructions and circular knit constructions. Raw materials employed in the constructions can include nylon, polyester and polyurethane-polyurea copolymers available under the trademarks Spandex and Lycra. Other flexible materials having elastic properties believed to be useful herein include extruded and molded synthetic and natural rubber.

Having described the invention that which is claimed is:

1. A cover for a barrel of an optical instrument, said barrel having a front lense end and an eye-piece end, said cover being comprised of a barrel support, a front lense cap and an eye-piece cap;

said barrel support is comprised of a linear body having a linear axis, a transverse axis, a forward end, a rearward end, a first strap and a second strap, wherein the length of said linear axis of said linear body is greater than the length of said transverse axis of said linear body;

said first strap is connected to a first location on said forward end of said linear body and extends to and is connected to a second location on said forward end of said linear body to thereby form a first continuous loop, wherein said first location and said second location are on opposite sides of said linear axis of said linear body;

said second strap is connected to a third location on said rearward end of said linear body and extends to and is connected to a fourth location on said rearward end of said linear body to thereby form a second continuous loop, wherein said third location and said fourth location are on opposite sides of said linear axis of said linear body;

said front lense cap is comprised of a lense shield and at least one forward tie wherein said lense shield is adapted to completely enclose said front lense end of said barrel; said forward tie is connected to said lense shield and to said forward end of said linear body intermediate said first location and said second location and is substantially in line with said linear axis of said linear body;

said eye-piece cap is comprised of an eye-piece shield and at least one rearward tie wherein said eye-piece shield is adapted to completely enclose said eye-piece end of said barrel; said rearward tie is connected to said eye-piece shield and to said rearward end of said linear body.

2. The cover of claim 1 wherein said optical instrument is a set of binoculars.

3. The cover of claim 1 wherein said cover is constructed of a flexible material having elastic properties.

4. The cover of claim 1 wherein said front lense cap is further comprised of three forward ties, one of which is connected to said lense shield and to said forward end of said linear body intermediate said first location and said second location and substantially in line with said the linear axis of said linear body, a second of which is connected to said lense shield and to said first location and a third of which is connected to said lense shield and to said second location.

5. The cover of claim 4 wherein said eye-piece cap is further comprised of two rearward ties, one of which is connected to said eye-piece shield and to said third location on said rearward end of said linear body and the second of which is connected to said eye-piece shield and to said fourth location on said rearward end of said linear body.

\* \* \* \* \*